United States Patent
Han et al.

(10) Patent No.: US 10,659,815 B2
(45) Date of Patent: May 19, 2020

(54) METHOD OF DYNAMIC ADAPTIVE STREAMING FOR 360-DEGREE VIDEOS

(71) Applicants: AT&T Intellectual Property I, L.P., Atlanta, GA (US); Indiana University Research and Technology Corporation, Indianapolis, IN (US)

(72) Inventors: Bo Han, Bridgewater, NJ (US); Vijay Gopalakrishnan, Edison, NJ (US); Jackson Jarrell Pair, Marina Del Rey, CA (US); Vikash Sharma, Marina Del Rey, CA (US); Feng Qian, Bloomington, IN (US); Qingyang Xiao, Bloomington, IN (US)

(73) Assignees: AT&T Intellectual Property I, L.P., Atlanta, GA (US); Indiana University Research and Technology Corporation, Indianapolis, IN (US)

(*) Notice: Subject to any disclaimer, the term of this patent is extended or adjusted under 35 U.S.C. 154(b) by 9 days.

(21) Appl. No.: 15/915,513

(22) Filed: Mar. 8, 2018

(65) Prior Publication Data
US 2019/0281318 A1   Sep. 12, 2019

(51) Int. Cl.
*H04N 19/597*   (2014.01)
*H04N 19/174*   (2014.01)
(Continued)

(52) U.S. Cl.
CPC ......... *H04N 19/597* (2014.11); *H04N 13/332* (2018.05); *H04N 13/344* (2018.05);
(Continued)

(58) Field of Classification Search
CPC .. H04N 19/597; H04N 19/147; H04N 13/332; H04N 19/174; H04N 13/366
See application file for complete search history.

(56) References Cited

U.S. PATENT DOCUMENTS 6,483,543 B1 *  11/2002  Zhang ............ H04N 21/234309
                                                  348/390.1
6,993,074 B2   1/2006  Li et al.
(Continued)

FOREIGN PATENT DOCUMENTS

| GB | 2525170 A | 10/2015 |
| GB | 2545999   | 7/2017  |

(Continued)

OTHER PUBLICATIONS

Corbillon, Xavier et al., "Viewport-Adaptive Navigable 360-Degree Video Delivery", May 1, 2017, 7 pages.
(Continued)

*Primary Examiner* — Joseph Suh
(74) *Attorney, Agent, or Firm* — Guntin & Gust, PLC; John G. Rauch

(57) ABSTRACT

Disclosed aspects may include, for example, maximizing a quality of experience when selecting encoding bitrates for downloading dynamically adaptive 360-degree panoramic video. Some embodiments include predicting a future orientation of a display region based on a first display region of the video, identifying predicted list of tiles for rendering the second display region, calculating a quality of experience from a plurality of encoding bitrates for the tiles in the second display region and one or more tiles in a margin area so that downloading the plurality of tiles at one or more bitrates is within estimated available embodiments, and downloading tiles for display.

20 Claims, 9 Drawing Sheets

(51) Int. Cl.
*H04N 13/366* (2018.01)
*H04N 13/332* (2018.01)
*H04N 19/147* (2014.01)
*H04N 13/344* (2018.01)

(52) U.S. Cl.
CPC ......... *H04N 13/366* (2018.05); *H04N 19/147* (2014.11); *H04N 19/174* (2014.11)

(56) References Cited

U.S. PATENT DOCUMENTS

| | | | |
|---|---|---|---|
| 7,260,564 B1* | 8/2007 | Lynn | H04N 21/64784 |
| 8,681,859 B2 | 3/2014 | Washington et al. | |
| 9,342,917 B2 | 5/2016 | Chavez et al. | |
| 9,429,752 B2 | 8/2016 | Schowengerdt et al. | |
| 9,690,099 B2 | 6/2017 | Bar-Zeev et al. | |
| 9,721,393 B1 | 8/2017 | Ben-Zacharia et al. | |
| 9,754,167 B1 | 9/2017 | Gordon et al. | |
| 2003/0040820 A1* | 2/2003 | Staver | A61B 6/4233 700/86 |
| 2004/0146102 A1* | 7/2004 | Okawa | H04N 21/23406 375/240.03 |
| 2005/0053136 A1* | 3/2005 | Yu | H04N 19/176 375/240.16 |
| 2008/0008458 A1* | 1/2008 | Gudipaty | G11B 27/034 386/240 |
| 2008/0075163 A1* | 3/2008 | Brydon | H04N 19/196 375/240.02 |
| 2010/0050221 A1* | 2/2010 | McCutchen | H04N 7/165 725/109 |
| 2013/0266065 A1 | 10/2013 | Paczkowski et al. | |
| 2013/0330055 A1 | 12/2013 | Zimmermann et al. | |
| 2015/0103079 A1* | 4/2015 | Khambanonda | G06T 11/60 345/441 |
| 2015/0156096 A1* | 6/2015 | Roh | G06F 9/455 709/224 |
| 2016/0012855 A1 | 1/2016 | Krishnan | |
| 2016/0142697 A1 | 5/2016 | Budagavi et al. | |
| 2016/0198140 A1 | 7/2016 | Nadler | |
| 2016/0260196 A1 | 9/2016 | Roimela et al. | |
| 2016/0267717 A1 | 9/2016 | Bar-zeev et al. | |
| 2016/0301957 A1* | 10/2016 | McCarthy | H04N 19/85 |
| 2016/0353146 A1 | 12/2016 | Weaver et al. | |
| 2016/0364017 A1* | 12/2016 | Wang | G09G 3/20 |
| 2017/0026659 A1 | 1/2017 | Lin et al. | |
| 2017/0075416 A1 | 3/2017 | Armstrong | |
| 2017/0223368 A1 | 8/2017 | Abbas et al. | |
| 2017/0236252 A1 | 8/2017 | Nguyen et al. | |
| 2017/0237983 A1 | 8/2017 | Adsumilli et al. | |
| 2017/0251208 A1 | 8/2017 | Adsumilli et al. | |
| 2017/0289219 A1 | 10/2017 | Khalid et al. | |
| 2017/0302918 A1 | 10/2017 | Mammou et al. | |
| 2017/0332117 A1 | 11/2017 | Haritaoglu et al. | |
| 2017/0339392 A1 | 11/2017 | Forutanpour et al. | |
| 2017/0339416 A1 | 11/2017 | Hendry et al. | |
| 2017/0347120 A1 | 11/2017 | Chou et al. | |
| 2017/0347163 A1 | 11/2017 | Wang | |
| 2017/0374375 A1 | 12/2017 | Makar et al. | |
| 2018/0033163 A1* | 2/2018 | Sugimoto | H04N 21/2408 |
| 2018/0115743 A1 | 4/2018 | Mcloughlin et al. | |
| 2018/0270531 A1* | 9/2018 | Ye | H04N 21/44218 |
| 2018/0368037 A1* | 12/2018 | Wang | H04W 36/06 |
| 2019/0104324 A1 | 4/2019 | Han et al. | |

FOREIGN PATENT DOCUMENTS

| | | |
|---|---|---|
| WO | 2015197818 A1 | 12/2015 |
| WO | 2016171404 A1 | 10/2016 |
| WO | 2017093611 A1 | 6/2017 |
| WO | 2017140945 A1 | 8/2017 |
| WO | 2017205648 | 11/2017 |
| WO | 2017205794 | 11/2017 |
| WO | 2018009746 | 1/2018 |

OTHER PUBLICATIONS

El-Ganainy, Tarek et al., "Streaming Virtual Reality Content", School of Computing Science, Simon Frasier University, Dec. 26, 2016, pp. 1-8.

Han, Bo, "Selective Streaming of Immersive Video Based on Field-of-View Prediction", U.S. Appl. No. 15/828,994, filed Dec. 1, 2017, Dec. 1, 2017, 65 pages.

Hosseini, Mohammad et al., "Adaptive 360 VR Video Streaming: Divide and Conquer!", Multimedia (ISM), 2016 IEEE International Symposium, IEEE, 2016., Nov. 17, 2017, 6 pages.

Kuzyakov, Evgeny, "Next-Generation Video Encoding Techniques for 360 Video and VR", Jan. 21, 2016, 7 pages.

Ozcinar, Cagri et al., "Viewport-Aware Adaptive 360 Video Streaming Using Tiles for Virtual Reality", IEEE International Conference on Image Processing 2017, Sep. 2017, 15 pages.

Petrangeli, Stefano et al., "An HTTP/2-Based Adaptive Streaming Framework for 360 Virtual Reality Videos", Proceedings of the 2017 ACM on Multimedia Conference, ACM, 2017., Oct. 23-27, 2017, 9 pages.

Qian, Feng et al., "Optimizing 360 Video Delivery Over Cellular Networks", Proceedings of the 5th Workshop on All Things Cellular: Operations, Applications and Challenges, ACM, 2016., Oct. 3-7, 2016, 6 pages.

* cited by examiner

200

300

320

340

400

500

| Algorithm | Bitrate Selection |
|---|---|
| 601: | Input: $B, t_d, a, PTL, DTL$ |
| 602: | $Level = \{b_1, ..., b_n\}$ |
| 603: | for $b_f \leftarrow b_n$ to $b_1$ do |
| 604: |   for $b_m \leftarrow b_n$ to 0 do |
| 605: |     $sum = 0$ |
| 606: |     for each $\alpha \in FOV$ do |
| 607: |       if $G(\alpha, t, b_f) \notin DTL$ then |
| 608: |         $sum = sum + size(G(\alpha, t, b_f))$ |
| 609: |       end if |
| 610: |     end for |
| 611: |     for each $\beta \in margin$ do |
| 612: |       if $G(\beta, t, b_m) \notin DTL$ then |
| 613: |         $sum = sum + size(G(\beta, t, b_m))$ |
| 614: |       end if |
| 615: |     end for |
| 616: |     if $sum \leq (t_d - t_{buffer}) \cdot B$ then |
| 617: |       compute $QoE = qoe(b_f, b_m, a)$ |
| 618: |       if $QoE > R.QoE$ then |
| 619: |         $R = (QoE, b_f, b_m)$ |
| 620: |       end if |
| 621: |     end if |
| 622: |   end for |
| 623: | end for |
| 624: | return $(R.b_f, R.b_m)$ |

FIG. 6

METHOD OF DYNAMIC ADAPTIVE STREAMING FOR 360-DEGREE VIDEOS

FIELD OF THE DISCLOSURE

The subject disclosure relates to dynamically adapting video streaming for 360-degree videos.

BACKGROUND

Recently, virtual reality (VR) technology has progressed beyond laboratories and into the commercial sector. VR is projected to form a substantial market by 2020. Users can now experience VR capabilities on their mobile devices using affordable VR devices such as a Google Cardboard. Immersive videos, also known as 360-degree videos or spherical videos, play an important role in a VR ecosystem. Such 360-degree videos provide users with panoramic views and create a unique viewing experience Immersive videos, such as 360-degree videos can be recorded by specially adapted cameras, such as omnidirectional cameras or camera array systems (e.g., Facebook Surround 360 Open Edition camera design and stitching code). They simultaneously record all 360 degrees of a scene that can be "wrapped" onto at least a portion of a 3D sphere, with the cameras at its center.

BRIEF DESCRIPTION OF THE DRAWINGS

Reference will now be made to the accompanying drawings, which are not necessarily drawn to scale, and wherein:

FIG. 6 illustrates a method for optimizing quality of experience in a throughput-based rate adaptation scheme of 360-degree video streaming;

DETAILED DESCRIPTION

Figure 1:
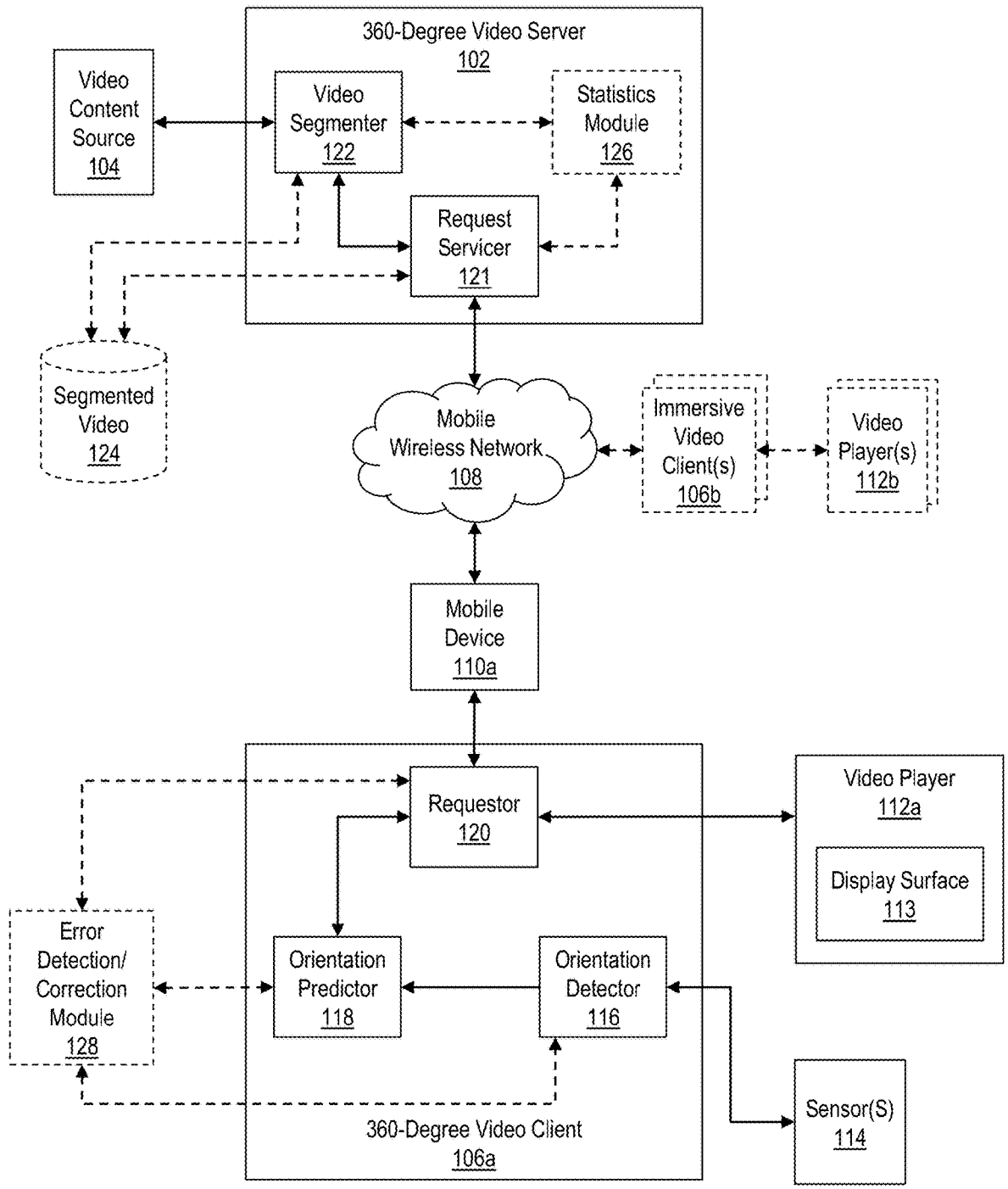
FIG. 1 depicts an illustrative embodiment of a 360-degree video processing system.

The subject disclosure describes, among other things, illustrative embodiments for determining dynamically adaptive bitrates for improving or maximizing quality of experience when streaming 360-degree video. Other embodiments are described in the subject disclosure.

One or more aspects of the subject disclosure include a device, comprising: a processing system including a processor; and a memory that stores executable instructions that, when executed by the processing system, facilitate performance of operations, the operations comprising: determining an estimated available bandwidth for downloading data to a video viewer; predicting a future orientation of a second display region to be presented at a display of the video viewer at a second time based on a first display region at a present time, wherein the first display region corresponds to a first plurality of tiles; identifying based on the future orientation of the second display region, a predicted list of tiles for rendering the second display region at the second time, wherein the second display region corresponds to a second plurality of tiles, wherein the predicted list of tiles includes the second plurality of tiles and zero or more tiles in a margin area outside of the second display region; calculating a maximum for a quality of experience from a plurality of first encoding bitrates for the second plurality of tiles and a plurality of second encoding bitrates for tiles in the margin area, resulting in a selected first encoding bitrate and a selected second encoding bitrate, wherein downloading the second plurality of tiles at the selected first encoding bitrate and the tiles in the margin area at the selected second encoding bitrate is within the estimated available bandwidth; and facilitating download of the second plurality of tiles at the selected first encoding bitrate and the tiles in the margin area at the selected second encoding bitrate to the video viewer.

One or more aspects of the subject disclosure include a machine-readable medium, comprising executable instructions that, when executed by a processing system including a processor, facilitate performance of operations, the operations comprising: predicting a future orientation of a second display region to be presented at a display of a video viewer at a second time based on a first display region at a present time, wherein the first display region corresponds to a first plurality of tiles; identifying based on the future orientation of the second display region, a list of tiles for rendering the second display region at the second time, wherein the second display region corresponds to a second plurality of tiles, wherein the list of tiles includes the second plurality of tiles and zero or more tiles in a margin area outside of the second display region; calculating a quality of experience from a plurality of first encoding bitrates for the second plurality of tiles and a plurality of second encoding bitrates for tiles in the margin area, wherein downloading the second plurality of tiles at each first encoding bitrate and the tiles in the margin area at each second encoding bitrate is within an estimated available bandwidth; selecting a first encoding bitrate and a second encoding bitrate based on the quality of experience calculated; and providing the first encoding bitrate and the second encoding bitrate selected to the video viewer for downloading the second plurality of tiles and the tiles in the margin area.

One or more aspects of the subject disclosure include a method, comprising: predicting, by a processing system including a processor, a future orientation of a display region to be presented at a display of a video viewer; identifying, by the processing system, a list of tiles for rendering the display region at the future orientation, wherein the display region corresponds to a plurality of tiles, wherein the list of tiles includes the plurality of tiles and zero or more tiles in a margin area outside of the display region; calculating, by the processing system, a quality of experience from a plurality of first encoding bitrates for the plurality of tiles and a plurality of second encoding bitrates for tiles in the margin area; selecting, by the processing system, a first encoding bitrate and a second encoding bitrate based on the quality of experience calculated; and providing, by the processing system, the first encoding bitrate and the second encoding bitrate selected to the video viewer for downloading the plurality of tiles and the tiles in the margin area.

FIG. 1 depicts an illustrative embodiment of a 360-degree video processing system 100. The system 100 includes a 360-degree video server 102 in communication with a video content source 104. The video content sources 104 provides immersive video content, such as 360-degree video media items, panoramic video media items, stereo video media items, 3D video media items, and the like. The 360-degree video server 102 is in further communication with a 360-degree video client 106 via a communication network 108.

In the illustrative example, the communication network 108 includes a wireless mobile network, such as a cellular network. It is understood that the communications network can include, without limitation, one or more wireless network components, such as, mobile cellular network components, Wi-Fi network components, satellite network components, terrestrial radio network components, and the like. Alternatively or in addition, the communication network 108 can include one or more wired network components, such as Ethernet, SONET, circuit-switched network components, e.g., SS7, cable, and the like. Although the example communication network 108 is illustrated by a single cloud, it is understood that the communication network 108 between the 360-degree video server 102 and the 360-degree video client 106 can include one or more networks of the same, similar and/or different configurations, e.g., combinations of wired and wireless, terrestrial, satellite, and the like.

Continuing with an illustrative example, a 360-degree video client 106a is in network communication with the communication network 108 by way of a mobile device 110a. The mobile device 110a can include, without limitation, any of the various devices disclosed herein or otherwise generally known to those skilled in the art of communications, such as mobile telephones, tablet devices, laptops, and the like. In a context of machine-to-machine (M2M) communications, e.g., according to an Internet of Things (IoT) paradigm, the mobile device 110a can include a machine, such as an appliance, a vehicle and the like.

The 360-degree video client 106a is in further communication with one or more of a video player 112a and a sensor 114. For example, the video player 112a can include a media processor and/or a display surface 113, such as a tablet display, a laptop display, a mobile phone display, gaming glasses or goggles, and the like. The sensor 114 can include one or more sensors generally adapted to facilitate determination of an orientation of a display surface 113 of the video player 112a. For example, the sensor 114 can include an inertial sensor, such as an accelerometer, that can detect and/or estimate a position and/or a change in position of the display surface 113 of the video player 112a. Sensor 114 can include those commonly found in smart phones and/or tablet devices. It is understood that in at least some embodiments, the sensor 114 can be internal to and/or otherwise attached to the video player 112a and/or the display surface 113. Accordingly, the sensor 114 can detect position and/or orientation of the display surface 113 based on the physical orientation and/or change in orientation of the video player 112a. Alternatively or in addition, the sensor 114 can be separate from the video player 112a. For example, the sensor 114 can include one or more of a motion sensor and/or a video sensors adapted to detect motion and/or position of the video player 112a. In at least some embodiments, a position and/or orientation of the display surface 113 of the video player 112a can be inferred or otherwise determined from a predetermined configuration of the display surface 113 within the video player 112a.

The example 360-degree video client 106a, includes an orientation detector 116, an orientation predictor 118 and a requestor 120. The orientation detector 116 is in communication with the sensor 114 and adapted to determine an orientation of the video player 112a, or more particularly, of a display surface 113 of the video player 112a based on sensor data obtained from the sensor 114.

The orientation of the video player 112a and/or display surface 113 can include, without limitation, a first direction, such as an azimuth angle and a second direction, such as an elevation angle. The azimuth angle and elevation angle, taken together can define a pointing direction of a normal to the display surface 113. In at least some embodiments, the azimuth angle and elevation angle can be further combined with a twist or rotation angle that further defines a rotational orientation of the display surface 113 with respect to the pointing direction.

In at least some embodiments, the orientation and or position of the display surface 113 can be defined in reference to a center of a coordinate system. Example coordinate systems can include spherical coordinate systems, cylindrical coordinate systems, polar coordinate systems, Cartesian coordinate systems and the like. By way of example, the orientation or position of the display surface 113 can be defined by rotations about orthogonal axis, such as rotations about x, y and z axes of a rectangular coordinate system. These angles are sometimes referred to as pitch, yaw and roll.

The 360-degree video server 102 includes a request servicer 121, and a video segmenter 122. The example video segmenter 122 is in communication with the video content source 104, and adapted to segment a 360-degree video media obtained from the video content source 104 into a plurality of spatial subsegments, subregions. For example, the video segmenter 122 can divide a 360-degree video frame into a number of subsegments, subregions, subframes. For a rectangular 360-degree video frame, the subsegments or subregions can be rectangles. It is understood that the subsegments and subregions can adapt to other shapes based on one or more of the nature of the 360-degree video frame, the display surface, one or more projection algorithms as may be applied and so on. For a spherical projection of a 360-degree video, the subregions can be portions of a spherical surface, e.g., defined according to a spherical coordinate system. Alternatively or in addition, the subregions can be portions of a cylindrical surface and/or portions of a rectangular surface. Even though the projected surface portrayed in the 360-degree video frame may confirm to a particular geometry, it is understood that the shape and/or size of the subsegments and/or subregions can be the same, similar and/or different. For example, the subsegments and/or subregions can be determined according to a projection algorithm, e.g., mapping a spherical surface to a cylindrical and/or rectangular surface.

It is generally understood that segmentation of a 360-degree video media item can be performed in real time or near-real time, e.g., in association with and/or responsive to a particular request from a requestor 120 of a particular 360-degree video client 106a. Alternatively or in addition, segmentation can be performed beforehand, e.g., offline, and stored for later use. In some embodiments, segmentation data alone or in combination with a segmented version of the 360-degree video media item can be stored in an optional segmented video repository 124 (shown in phantom).

Segmentation data can include, without limitation, identification of the subsegments and/or subregions of a segmented 360-degree video media item. For example, this can include individually addressable segments, e.g., subsegment (i, j) of an M×N array of subsegments of a particular 360-degree video frame. As 360-degree video media items can include arrays of 360-degree video frame, it is understood that a common subsegment referencing and/or indexing scheme can be applied to more than one, e.g., all, frames of a particular 360-degree video media item. Accordingly, subsegments and/or subregions can be identified and addressed independently and/or collectively in groups. Groups of subsegments and/or subregions can conform to a particular shape, e.g., a contiguous shape, such as a rectangle, an oval, and the like. Alternatively or in addition, subsegments and/or subregions can be addressed according to ranges.

In operation, the orientation detector 116 determines actual and/or estimated orientations of the video player and/or display surface 113, based on input from the sensor 114. Actual orientations are provided to the orientation predictor 118, which, in turn, predicts a future position and/or orientation of the video player 112a and/or the display surface 113. As described further hereinbelow, the orientation predictor 118 can apply one or more algorithms that can predict future position/orientation based at least in part on past positions/orientations.

The orientation predictor 118, in turn, provides an indication of a predicted position and/or orientation to the requestor 120. In at least some embodiment, the predicted position/orientation is further associated with a future time at which the position/orientation of the video player 112a and/or display surface 113 has been determined. The requestor 120, in at least some embodiments, can be adapted to determine other information, such as a field-of-view of the video player 112a and/or display surface 113. The field-of-view can be defined according to one or more of spatial dimensions on a mapped surface, angular ranges and/or pixel ranges. It is understood that in at least some embodiments, that the field of view may differ according to one or more of orientation, e.g., looking down versus straight ahead, a type of projection used in association with the 360-degree video frame, and so on.

In at least some embodiments, the requestor 120 receives an indication and/or is otherwise pre-configured with information describing how the subsegmentation/subregions are/have been applied to the 360-degree video frames. Together with the predicted position/orientation and the field of view, the requestor 120 can determine which subsegments/subregions will fall in and/or near the display surface 113 at the future time associated with the prediction, e.g., 0.5 sec, or 1-sec into the future.

In at least some embodiments, the prediction time can be selectable and/or variable. For example, the prediction time can be based on one or more of data transfer size and/or bandwidth, network conditions, subscription levels, quality of experience, and the like. It is understood that network bandwidth and/or latency can depend upon network conditions, such as congestion, interference, signal propagation loss, and the like. Accordingly, the prediction time can be based upon an estimate of a difference between a time at which a request is made by the requestor 120 and a time at which the requested segments/regions are of a requested segment size are delivered to the 360-degree video client. Other delays can be factored into this determination, such as processing delays of one or more of the 360-degree video client, the video player 112a and/or the 360-degree video server 102.

The request servicer 121 is in communication with the requestor 120 via the communication network 108. The requestor 120 submits a request for a group of subsegments or subregions of a particular 360-degree video frame. The request servicer 121 receives the request and responds by facilitating transfer of the requested subsegments/subregions via the communication network 108. It is understood that the request servicer 121 can service a single request by sequential, e.g., serial, delivery of individual subsegments of the requested group, and/or contemporaneous, e.g., parallel, delivery of multiple segments of the requested group. In at least some embodiments, individual requests can be made and processed according to each subsequent video frame of a 360-degree video media item. Alternatively or in addition, the processing can be applied to groups of frames. For example, a single prediction can be made at a prediction time, and then used to process more than one frame of the 360-degree video media item. In some instances, multiple frames include separate frames of a stereo and/or 3D immersive video media item, e.g., left and right frame components. In at least some embodiments, the same request is made for successive video frames of a 360-degree video media item. This can provide some relief to the processing and cut down on overhead, possibly at a sacrifice of accuracy, due to increased estimate times. In some embodiments, the requestor 120 may specify a version of the requested subsegments/subregions corresponding to a particular encoding rate.

In some embodiments, the 360-degree video server 102 includes a statistics module 126 (shown in phantom). The statistics module 126 can determine statistics based multiple requests that can be used, in turn, by one or more of the request servicer 121, the video segmenter 122, the requestor 120 and/or the orientation predictor 118. For example, the statistics module 126 can track requests received from multiple 360-degree video clients 106a, 106b (generally 106) and or video players 112a, 112b (generally 112). The statistics module 126 can also associate past requests with one or more of 360-degree video media items. It is envisioned that some regions of a 360-degree video frame may be requested more than others based on a nature of the 360-degree video media item content. Accordingly, segments can be associated with a frequency, based on past requests, as described further hereinbelow. Alternatively or in addition, the statistics module 126 can associate one or more of network conditions, time of day, day of week, service level, requestor profile, region, demographics and the like. Statistics can be determined according to one or more of the example parameters and used in association with subsequent requests to improve system performance by reducing errors, reducing quantities of invisible segments as may be associated with requests to manage errors and so on.

In some embodiments, the system 100 optionally includes an error detection/correction module 128 (shown in phantom). In the illustrative embodiment, the error detection/correction module 128 is in communication with one or more of the orientation detector 116, the orientation predictor 118 and the requestor 120. In some embodiments, the error detection/correction module 128 stores a prediction received from the orientation predictor 118. At a later time corresponding to the prediction, the error detection/correction module 128 receives an actual position from the orientation detector 116. An error can be determined according to a difference between the predicted and actual positions. To the extent that an error is determined, one or more of the requestor 120 and the video player 112a can process received subsegments to improve performance. As disclosed hereinbelow, the request can be services with subsegments of the 360-degree video frame that overlap the field of view, sometimes referred to as visible segments, as well as frames that border and/or surround the overlapped frames, without overlapping the predicted field of view.

It is understood that in at least some embodiments, the error detection/correction module 128 can be in communication with the statistics module 126 to facilitate statistical tracking of errors. For example, if the errors are significant, the quantity of invisible segments can be increased and/or a quality of invisible segments can be increased in anticipation of errors. Although such increases to the quantity and/or quality of invisible subsegments generally reduces bandwidth savings, savings may still be realized when compared to an alternative of transferring the entire 360-degree video frame. Even in instances in which error performance dictates that the entire 360-degree video frame be transferred, the system 100 will allow for bandwidth savings to be realized during other periods when error performance may be less. When watching a 360-degree video, a video player 112a at a center of a 360-degree video media presentation, e.g., at a spherical center, can freely control her viewing direction, so each playback creates a unique experience. For example, a viewer in a browser can click and drag a mouse cursor to change the viewing direction. In another example, a viewer may physically change the orientation of the viewing device. Accelerometers within the viewing device may then supply signals that changes the viewing direction.

Figure 2:
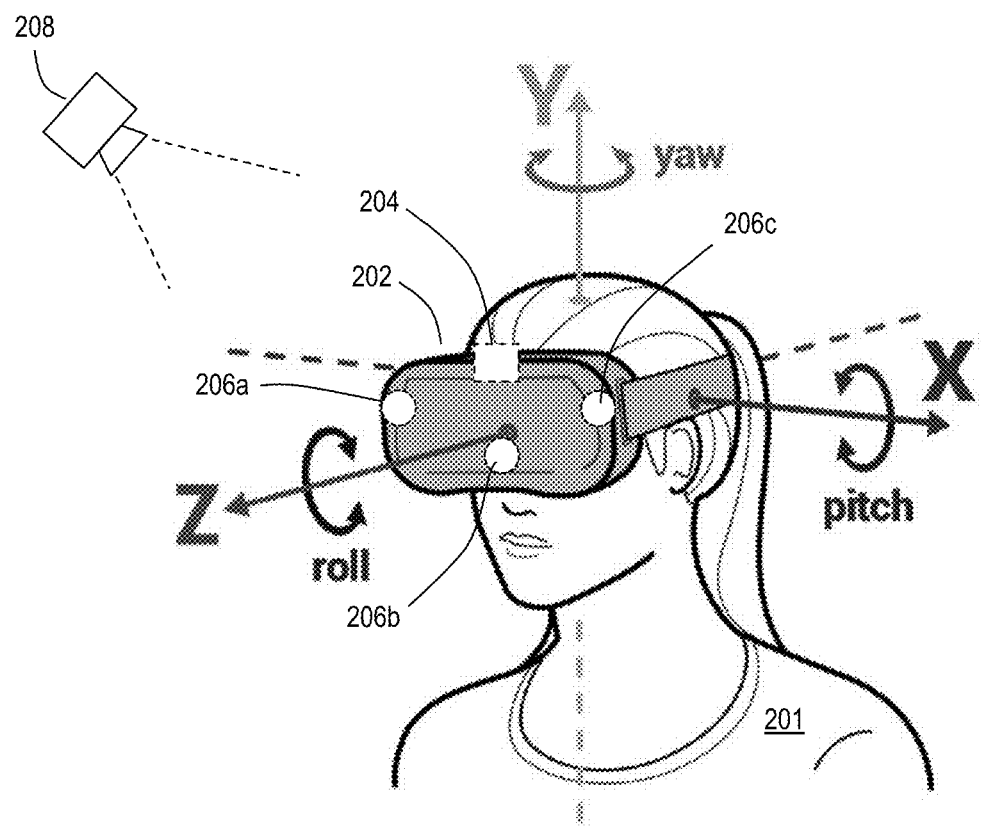
FIG. 2 depicts an illustrative embodiment of a video viewing device.

FIG. 2 depicts an illustrative embodiment of a video viewing device 200. As shown in FIG. 2, a user 201 wearing a VR headset 202 can adjust her orientation by changing the pitch, yaw, and/or roll of the VR headset 202, which correspond to rotating along one or more of the X, Y, and Z axes, respectively. Then a 360-degree video player, e.g., within the VR headset 202, computes and displays a viewing area, i.e., a display surface, based on the orientation and the field-of-view (FoV). The FoV can define an extent of the observable area, which is usually a fixed parameter of a VR headset (e.g., 110° horizontally and 90° vertically).

The example VR headset 202 can be equipped with a position and/or orientation sensor 204, such as position/orientation sensors available on smartphones, gaming goggles and/or tablet devices. Alternatively or in addition, the VR headset 202 includes one or more reference markers 206a, 206b, 206c (generally 206). The reference markers 206 are spaced apart in a predetermined configuration. An external sensor, such as a video camera 208, is positioned to observe the VR headset 202 during active use. The video camera 208 detects positions of the reference markers 206. Further processing, e.g., by an orientation detector 116 (FIG. 1) can determine a position and/or orientation of the VR headset 202 based on the detected/observed positions of the reference markers 206.

Immersive videos are very popular on major video platforms such as YOUTUBE® and FACEBOOK® platforms. Despite their popularity, the research community appears to lack an in-depth understanding of many of its critical aspects such as performance and resource consumption. The disclosure provided herein is intended to fill this gap by investigating how to optimize 360-degree video delivery over wireless mobile, e.g., cellular, networks, which are anticipated as forming a key infrastructure that facilitates ubiquitous access of network accessible VR resources, e.g., in the cloud. To a large extent, 360-degree video inherits delivery schemes from traditional Internet videos. This simplifies the deployment, but makes 360-degree video streaming very cellular-unfriendly, because the video player always fetches the entire video including both visible and invisible portions. This leads to tremendous resource inefficiency on cellular networks with limited bandwidth, metered link, fluctuating throughput, and high device radio energy consumption.

As an important component of the virtual reality (VR) technology, 360-degree videos provide users 201 with panoramic views allowing them to freely control their viewing direction during video playback. Usually, a VR headset 202 displays only the visible portion of a 360-degree video. Thus, fetching the entire raw video frame wastes bandwidth. The techniques disclosed herein address the problem of optimizing 360-degree video delivery over wireless, e.g., cellular, networks. A measurement study was conducted on commercial 360-degree video platforms. A cellular-friendly streaming scheme is disclosed that delivers only a 360-degree video's visible portion based on head movement prediction. Viewing data collected from real users was used to demonstrate feasibility of an approach that can reduce bandwidth consumption by up to 80% based on a trace-driven simulation.

Conceptually, a novel cellular-friendly streaming scheme for 360-degree videos avoids downloading an entire 360-degree video, instead only fetching those parts, e.g., spatial segments or portions, of the 360-degree video that are visible to the user 201 in order to reduce bandwidth consumption associated with the video transfer. As display of any of the portion of the 360-degree video requires that the portion be fetched or otherwise downloaded, the disclosed approach benefits from a prediction of a viewer's head movement (to determine which portion of the 360-degree video view to fetch). Trace-driven analysis indicated that, at least in the short term, a viewers' head movement can be accurately predicted, e.g., with an accuracy >90%, by even using simple methods such as linear regression.

Figure 3A:
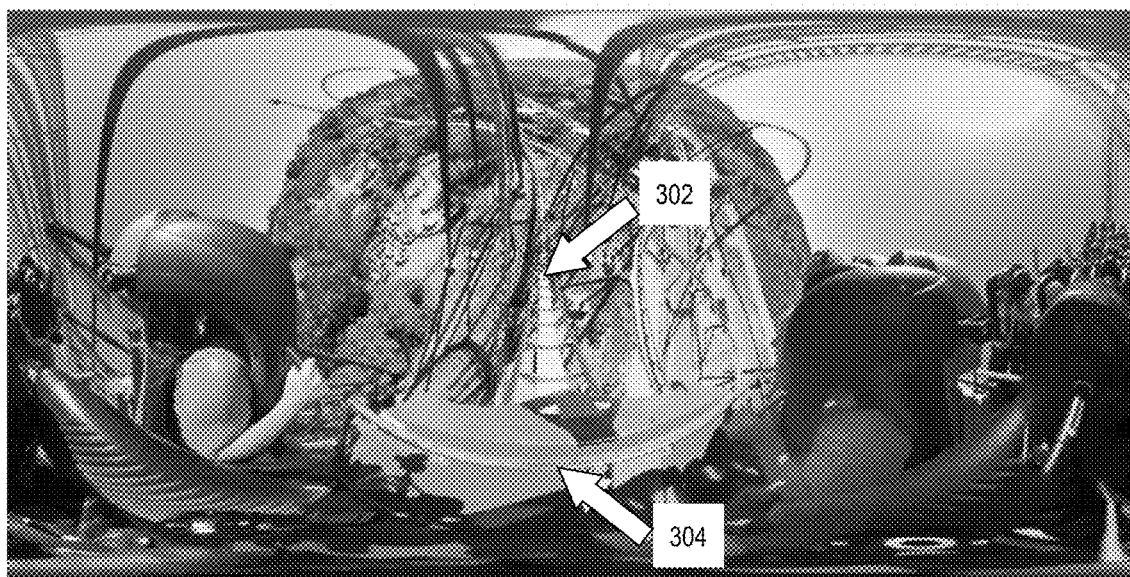
FIG. 3A depicts an illustrative embodiment of a raw frame of 360-degree video.

FIG. 3A depicts an illustrative embodiment of a raw frame of 360-degree video. Both YOUTUBE® and FACEBOOK® presently encode 360-degree videos into a standard H.264 format in an MP4 container. It is understood that a 360-degree video can be playable in conventional media players, e.g., only showing raw frames as exemplified in by a large image of raw frame 300 in FIG. 3A of a video at youtube.com/watch?v=-xNN-bJQ4vI. As shown, the raw frame 300 is distorted because it was projected from the 3D panoramic sphere.

Figure 3B:
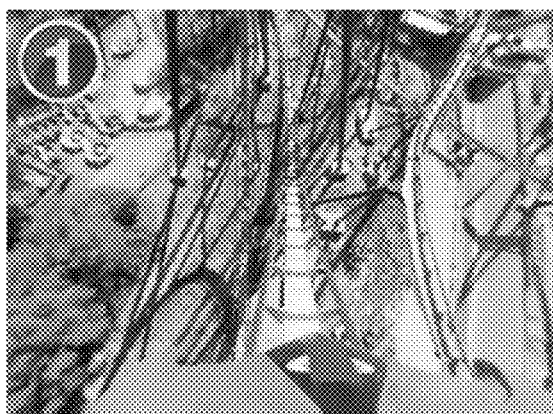
FIGS. 3B and 3C depict illustrative embodiments of frames visible by the video viewing device of FIG. 2, when a viewer is looking at different viewpoints within the 360-degree video image frame.
Figure 3C:
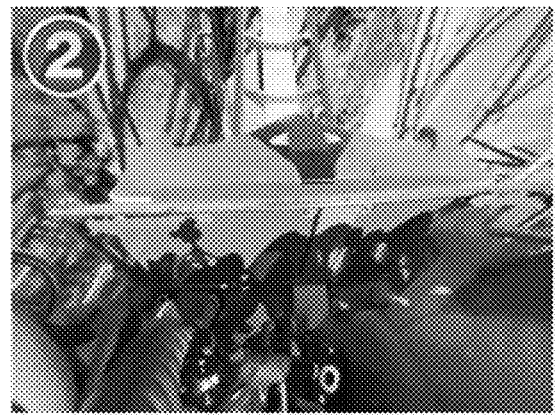

FIGS. 3B and 3C depict illustrative embodiments of frames visible by the video viewing device of FIG. 2, when a viewer is looking at different viewpoints within the 360-degree video image frame. When a viewing area of a virtual reality headset is determined, such as at points 302 and 304 of raw frame 300, the visible portion is then reversely projected from the raw frame 300 to the screen, as illustrated by the two smaller images 320 and 340, respectively, as shown in FIG. 3B and FIG. 3C.

The raw video frames of the different 360-degree video sources, e.g., YOUTUBE® and FACEBOOK®, exhibit different visual "patterns" based on their use of different projection algorithms. For example, YOUTUBE® employs an equi-rectangular projection that directly uses the latitude and longitude on a sphere as the vertical and horizontal coordinates, respectively, on the raw frame. FACEBOOK® employs a different projection scheme, referred to as Cube Map that offers less distortion in the polar areas of the sphere.

Both YOUTUBE® (on Android app) and FACEBOOK® (on Chrome for Windows 10) use progressive download over HTTP, a widely used streaming technique, to deliver 360-degree videos. Progressive download allows a client to start playing the video before it is fully downloaded. It is realized using HTTP byte range request.

Both video platforms support multiple encoding bitrates for 360-degree videos. The viewer can switch between standard definition (SD) and high definition (HD) versions on FACEBOOK.® YOUTUBE® provides up to 8 bitrate levels from 144s to 2160s. Note the video quality numbers refer to the resolution of the entire raw frame 300 FIG. 3A, in which the viewer only sees a small portion at any given time, e.g., a first portion at point 302, depicted in the image 320 of FIG. 3B or a second portion at point 304, depicted in the image 340 of FIG. 3C. Therefore, to achieve the same user-perceived playback quality, the raw frame quality of a 360-degree video has to be much higher than that of a non-360 video. For a decent user experience, a 360-degree video can be streamed at least 1080s, whereas, a reasonable quality for conventional videos can be less, e.g., 480p. However, when watching the video in FIG. 3A under 480s, the quality can be unacceptably bad, e.g., depending upon the viewing angle, because the user 201 (FIG. 2) in fact has a stretched view of a subarea of a 480s frame.

As a direct consequence of the above observations, for the same user 201 perceived quality, 360-degree videos have very large sizes. Table 1 lists sizes of four example 360-degree videos on the YOUTUBE® platform, assuming 1080p is the minimum video quality for a reasonable Quality of Experience (QoE). This inevitably causes issues on cellular networks with limited bandwidth (in particular when signal strength is not good) and metered link.

TABLE 1

Sizes of four 360-degree videos on YOUTUBE ®

| Video Scene | Length | 1080 s | 1440 s | 2160 s |
| --- | --- | --- | --- | --- |
| Roller coaster | 1'57" | 66 MB | 105 MB | 226 MB |
| Animals | 2'49" | 52 MB | 129 MB | 246 MB |
| Aerobatic Flight | 8'12" | 172 MB | 350 MB | 778 MB |
| Google IO 2016 | 2h8'34" | 1.7 GB | 4.9 GB | 9.1 GB |

For both YOUTUBE® and FACEBOOK® platforms, the client appears to download the entire raw frame regardless of user's viewing direction. This leads to tremendous waste of network bandwidth, because most areas of a raw frame are not viewed by the user. Based on a simulation disclosed hereinbelow, such unseen or otherwise invisible areas can account for up to 80% of network bandwidth consumed by 360-degree video playback. Using a single H.264 video stream, it is inherently impossible for a 360-degree video client to fetch a subarea of a raw frame.

The foregoing measurements indicated that 360-degree videos largely inherit the delivery scheme from traditional Internet videos. The obvious advantage is simplicity: virtually no change is required on the server side, and a non-360-degree video player can be easily enhanced to support 360-degree videos by adding projection and head movement detection. However, the negative side is, streaming 360-degree videos is very bandwidth consuming, because (1) under the same user perceived quality, 360-degree videos have much larger sizes than non-360-degree videos, and (2) today's 360-degree video players always fetch the entire raw frame including both the visible and invisible portion. This may not be a big issue for wired and high-speed Wi-Fi networks. However, the scheme is not friendly to cellular networks where radio resources are scarce and bandwidth is limited. Also, downloading excessive data hurts mobile devices' battery life because cellular radio is known to be energy-hungry: when in active use, the 3GPP LTE radio can account for at least 50% of the entire smartphone's energy consumption.

For traditional videos, to support simultaneous download and playback, a video is temporally segmented into chunks or byte ranges. To support downloading a subsegment, subregion or subarea of a video chunk, the video also needs to be spatially segmented. This can be realized in an online manner: the video client 106 computes the target area of a chunk, and embeds them into HTTP request parameters; the server then dynamically generates a smaller chunk containing only the target area and transmits it to the client. This approach may suffer from two drawbacks. First, it can increase the server-side computational overhead. Second, due to projection, the target area is not a rectangle, making it hard for the client to specify the target area.

In at least some embodiments, the 360-degree video media item is spatially segmented offline. For example, each 360-degree video chunk can be pre-segmented into multiple smaller chunks, referred to herein as tiles. A tile can have the same duration as a chunk, while only covering a subarea of the chunk. At least one way to generate the tiles is to evenly divide a chunk containing projected raw frames into m*n rectangles each corresponding to a tile. Suppose the projected visible area is θ. The client only requests for the tiles that overlap with θ.

Figure 4:
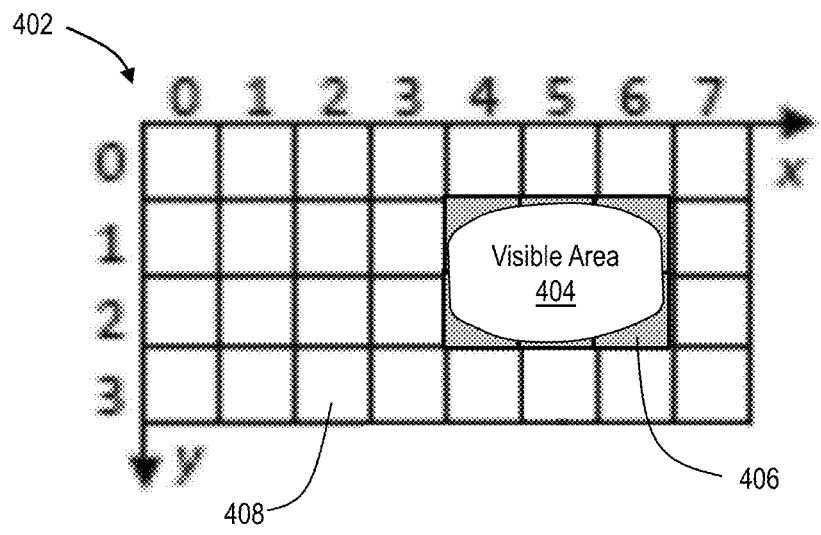
FIG. 4 depicts an illustrative embodiment of spatial segmentation of a video chunk into tiles.

FIG. 4 depicts an illustrative embodiment of spatial segmentation of a video chunk. Each 360-degree video chunk is pre-segmented into multiple smaller chunks, which are called tiles. A tile has the same duration as a chunk while only covering a subarea of the chunk. The easiest way to generate the tiles is to evenly divide a chunk containing projected raw frames into m×n rectangles each corresponding to a tile. FIG. 4 illustrates an example pre-segmented chunk 402, where m=8 and n=4, resulting in 32 tiles 408 and where the visible area, θ is illustrated as a bounded display region 404. The client may only request the six tiles (4≤x≤6; 1≤y≤2) overlapping with the display region 404. Note that due to projection, despite the viewer's field-of-view being fixed, the size of the display region 404 and thus the number of requested tiles 406 may vary. For example, under equi-rectangular projection, as shown in FIG. 3A, more tiles are needed when the viewer looks downward at point 304 compared to when she looks straight forward at point 302.

Besides the above approach, an alternative and more complex way is to apply segmentation directly on a 360-degree projection surface, such as a 3D sphere of a 360-degree video, instead of on a projected 2D raw frame of pre-segmented chunk 402 so that each tile covers a fixed angle, e.g., a fixed solid angle. This makes the number of tiles to be requested irrespective of user's viewing direction (but their total bytes may still vary).

Performing the spatial segmentation of 360-degree video frames offline can reduce and/or otherwise eliminate server-side overhead. Multiple tiles 408 can be requested in a single bundle to reduce network roundtrips. A tiles' metadata such as positions and/or addresses (e.g., web addresses or URLs) can be embedded in a metafile exchanged at the beginning of a video session.

If a viewer's head movement during a 360-degree video session is known beforehand, an optimal sequence of tiles can be generated that minimizes the bandwidth consumption. To approximate this in reality, a prediction of head movement is determined, e.g., according to a pitch, yaw, and roll and/or a change of pitch, yaw, and roll.

In at least some embodiments, the predictions and/or selective video fetch of portions of 360-degree video frames can be integrated with DASH and/or HTTP. Although currently most 360-degree videos use progressive download, it is envisioned they may switch to a Dynamic Adaptive Streaming over HTTP (DASH). Extensive research has been conducted on improving the QoE of DASH video. A DASH video is split into chunks encoded with multiple discrete bitrate levels; a video player can switch between different bitrate levels at a chunk boundary. In contrast, 360-degree videos involve more complexity, because the player needs to make decisions at both the temporal and spatial dimension.

An important component of a DASH scheme is its rate adaptation algorithm, which determines the quality level of chunks to fetch. Improved techniques for 360-degree video streaming over cellular networks disclosed herein reduce bandwidth consumption, preferably with little or no detrimental effects to playback observed by a VR headset 202 (FIG. 2). Basically, instead of downloading entire 360-degree raw frames, a video client 106 (FIG. 1) predicts the future FoV of a viewer and then fetches only the tiles in the FoV in order to optimize the bandwidth consumption.

Dynamically switching between various video-quality levels requires an algorithm to select the chunks' bitrates for achieving an optimal QoE. There are largely two categories of DASH rate adaptation algorithms, buffer-based and throughput-based. A buffer-based approach makes more sense with a relatively large buffer size (e.g., 30-60 seconds of video chunks). However, the accuracy of FoV prediction (e.g., the prediction of head movement) decreases as the duration of the prediction window opens. For example, it is easier to predict where a user will look at for the next second than 10 seconds later. When the buffer is large, non-accurate FoV prediction will lead to the downloading of content that will not be consumed by users. What is worse, it may miss the content overlapping with FoV and introduce more challenges to the tile/chunk fetching. Buffer Based Adaptation (BBA) chooses the bitrate based on a video player's buffer occupancy level, which implicitly encodes information of the network capacity when the video playing is at the steady state.

The throughput-based adaptation adjusts the encoding rate of chunks based on the estimated throughput, which indicates the future network capacity. For instance, FESTIVE uses harmonic mean of previous chunks' throughputs to estimate the future throughput, which dictates the rate selection. Since state-of-the-art 360-degree video streaming schemes download the entire raw video, which has no fundamental difference with non-360-degree video streaming, existing rate adaptation algorithms can be applied with almost no modifications. However, these simple solutions waste bandwidth and make the delivery of high-resolution 360-degree videos challenging. In an embodiment, enabling rate adaptation for tile-based 360-degree video streaming is the goal.

Figure 5:
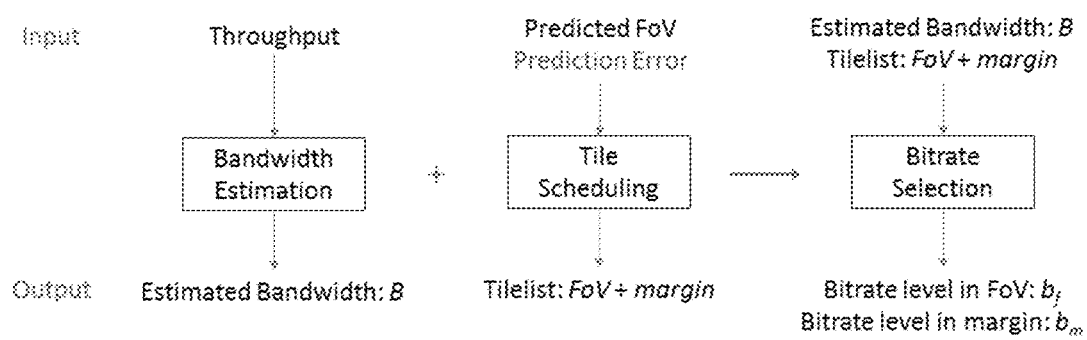
FIG. 5 is a block diagram illustrating an architecture for throughput-based rate adaptation for 360-degree video streaming.

FIG. 5 is a block diagram illustrating an architecture 500 for throughput-based rate adaptation for tile based 360-degree video streaming. As shown in FIG. 5, the bitrate selection depends on two inputs, the estimated bandwidth B and the predicted list of tiles (PTL) comprising tiles that have already been downloaded (DTL), and tiles that need to be fetched (FTL). Existing schemes can be used for estimating bandwidth. For example, the harmonic mean of previous tiles' or chunks' throughputs can be used to estimate future throughput. Suppose the history window for FoV prediction is $t_h$ and the prediction window is $t_p$. That is to say, historical information available from $t-t_h$ to t is used to predict the FoV from t to $t+t_p$. The FoV prediction is updated periodically with an update interval $t_u$.

Note that both PTL and DTL are First-In-First-Out (FIFO) queues. However, FTL is a priority queue. As mentioned before, to handle prediction errors, the FoV prediction will be updated every $t_u$. When the prediction is not accurate, and there are tiles that should be in a FoV but are missed in the PTL, those tiles will be added to the head of the FTL directly and give them a higher priority than other tiles already in FTL.

The procedure to determine the list of tiles to be fetched FTL depends on the FoV prediction and the tile scheduling scheme. The PTL includes both tiles $\alpha$ in a FoV and tiles $\beta$ that are in a margin area surrounding the FoV, which would be used in the event that predicted FoV was inaccurate. For example, in FIG. 4, the client can further fetch surrounding tiles such as (3, 1) and (4, 0). These additionally fetched tiles are known as out-of-sight (OOS) tiles, as they will remain invisible unless a prediction error occurs. If there is no prediction error, then FTL=PTL−DTL.

Clearly, downloading a large number of OOS tiles incurs a tradeoff between bandwidth consumption and user experience. The number of OOS tiles can be, for example, dynamically determined by the recent prediction error maintained by the player.

FIG. 6 illustrates a method 600 that optimizes QoE in a throughput-based rate adaptation scheme of 360-degree video streaming. The method comprises a greedy algorithm that can be implemented by the system, for example, in the 360-degree video server 102, the 360-degree video client of FIG. 1, or a combination thereof.

As shown in FIG. 6, in line 601 inputs are provided to the system implementing the greedy algorithm comprising: the estimated bandwidth B, the display time remaining for the to-be-fetched tiles $t_d$, the prediction accuracy a, the predicted tile-list PTL, and the downloaded tile-list DTL. Note that the PTL includes both tiles $\alpha$ in a FoV and tiles $\beta$ that are in the margin area.

Line 602 shows that $b_f$ can be any available video encoding bitrate between $b_l$ and $b_n$. Also note that $b_m$ can be 0 which means that the corresponding tile is not needed. Two main loops iterate all the possible video encoding bitrates, $b_f$ for tiles in FoV, shown in line 603, and $b_m$ for tiles in the margin area, as shown in line 604. In an embodiment, $b_m$ should be less than $b_f$, but this constraint is not explicitly illustrated in FIG. 6.

Within the two main loops, the required bandwidth is calculated by adding the size of all tiles in FoV (lines 606-610) and then that of all tiles in the margin area (lines 611-615) based on the selected $b_f$ and $b_m$.

In line 16, the key constraint that the bandwidth required for the total size (sum) of tiles that need to be fetched FTL should not be greater than the available bandwidth ($t_d-t_{buffer}$)*B. $t_{buffer}$ is the playback buffer duration. Assume the duration for a Group-Of-Pictures (GOP) is $t_{GOP}$. If the display time of the last downloaded GOP is $t_c$, then system must fetch the next GOP before $t_d=t_c+t_{GOP}$.

Next, the QoE is calculated from the current $b_f$ and $b_m$, as shown in line 617. In an embodiment, since a user's focus is mainly in the FoV area, the system does not need to spend unnecessary bandwidth fetching tiles in the margin area when the prediction is accurate. Thus, a coefficient of $b_m$ in the QoE calculation is 1-a. In an embodiment, minimizing video quality switching between consecutive chunks or tiles when possible may be desirous, which can be therefore controlled by another parameter γ. Hence, QoE can be computed as follows:

$$QoE = b_f + b_m*(1-a) - \gamma[b_f(t) - b_f(t - t_{GOP})]$$

If the calculated QoE is better than that previously found, the QoE is updated with the better choice discovered, as shown in lines 618-620. The update guarantees that after completing the two main loops, bitrate selection for $b_f$ and $b_m$ are found. Hence, the goal to maximize the QoE, which is a combination of the quality of the tiles in FoV, the tiles in the margin area, and tiles remaining in the last GOP, will be achieved. As shown in line 624, the system returns the adaptive bitrates of $b_f$ for tiles in FoV and $b_m$ for tiles in the margin area that maximizes the QoE.

While for purposes of simplicity of explanation, the respective processes are shown and described as a series of steps in FIG. 6, it is to be understood and appreciated that the claimed subject matter is not limited by the order of the steps, as some steps may occur in different orders and/or concurrently with other steps from what is depicted and described herein. Moreover, not all illustrated steps may be required to implement the methods described herein.

Figure 7:
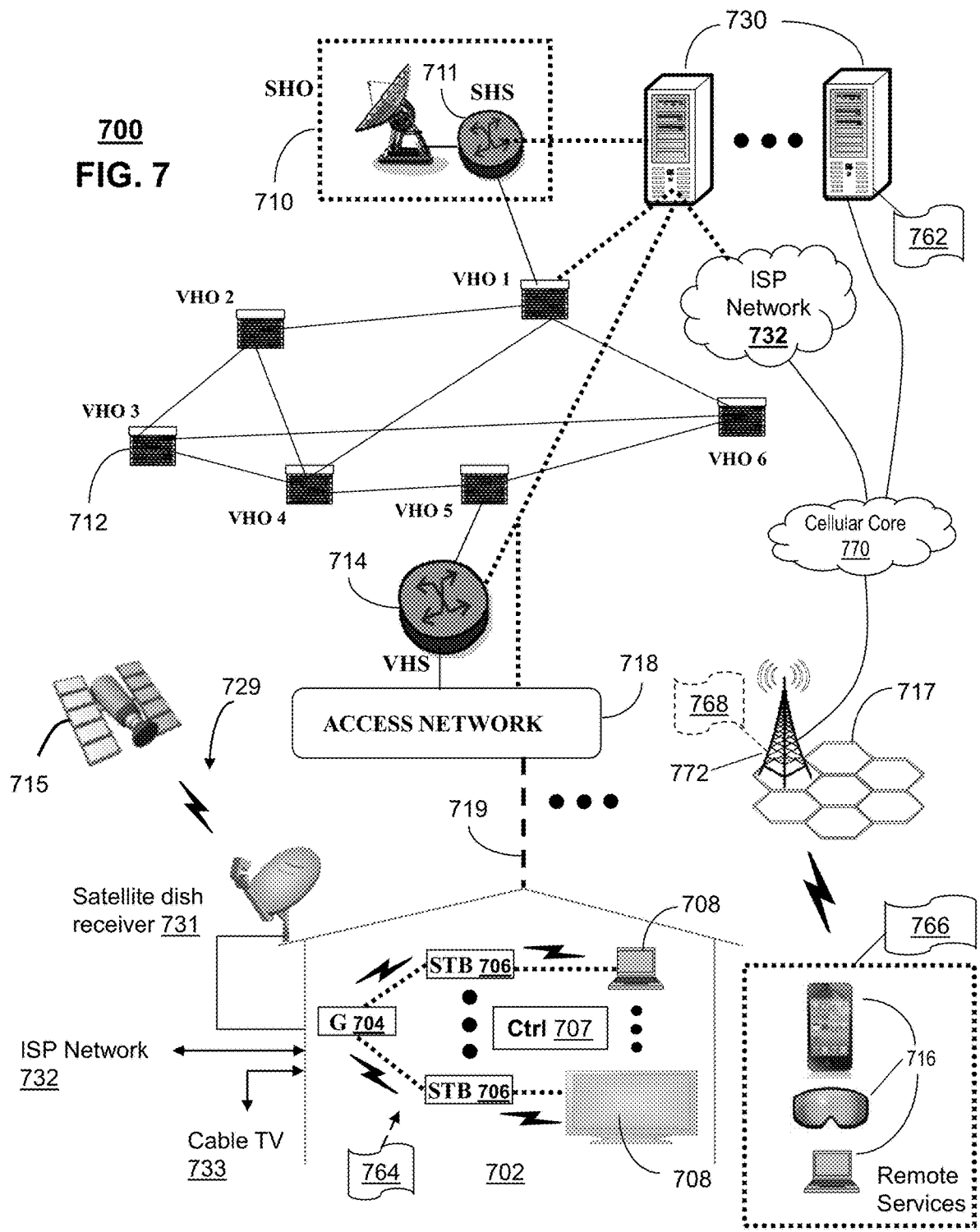
FIGS. 7-8 depict illustrative embodiments of communication systems that provide media services.

FIG. 7 depicts an illustrative embodiment of a communication system 700 for providing various communication services, such as delivering media content. The communication system 700 can represent an interactive media network, such as an interactive television system (e.g., an Internet Protocol Television (IPTV) media system). Communication system 700 can be overlaid or operably coupled with the 360-degree video server 102 or video client 106a of system 100 or device 200 of FIGS. 1 and/or 2 as another representative embodiment of communication system 700. For instance, one or more devices illustrated in the communication system 700 of FIG. 7 can perform a method that includes predicting a future orientation of a display region to be presented at a display of a video viewer; identifying a list of tiles for rendering the display region at the future orientation, wherein the display region corresponds to a plurality of tiles, wherein the list of tiles includes the plurality of tiles and zero or more tiles in a margin area outside of the display region; calculating a quality of experience from a plurality of first encoding bitrates for the plurality of tiles and a plurality of second encoding bitrates for tiles in the margin area; selecting a first encoding bitrate and a second encoding bitrate based on the quality of experience calculated; and providing the first encoding bitrate and the second encoding bitrate selected to the video viewer for downloading the plurality of tiles and the tiles in the margin area.

In one or more embodiments, the communication system 700 can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (Wi-Fi), Bluetooth®, ZigBee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a requestor (herein referred to as requestor 730). The requestor 730 can use computing and communication technology to perform function 762, which can include among other things, the 360-degree video processing techniques described by method 600 of FIG. 6. For instance, function 762 of requestor 730 can be similar to the functions described for video server 102 or video client 106 of FIG. 1 in accordance with method 600. The media processors 706 and wireless communication devices 716 can be provisioned with software functions 764 and 766, respectively, to utilize the services of requestor 730. For instance, functions 764 and 766 of media processors 706 and wireless communication devices 716 can be similar to the functions described for the 360-degree video client 106a of FIG. 1 in accordance with method 600 of FIG. 6.

In at least some embodiments, the cellular network 717 includes a cellular core network 770 performing one or more core functions based on the applicable cellular protocols, e.g., 3GPP LTE, 5G, and the like. According to the illustrative embodiment, the cellular core network 770 can be in communication with the requestor 730, e.g., via a network connection, such as an Internet connection. Alternatively or in addition, the requestor 730 can be collocated with equipment of the cellular core network 770, e.g., at a common data center.

Although certain functions are disclosed at different locations in relation to the cellular network, it is understood that one or more of the various functions can be implemented at one or more different locations. For example, the 360-degree video client 106 can be implemented within a video player, and/or within a separate processor in local communication with the video player. With respect to the communication network 108, the foregoing locations would be at a UE portion of a wireless link. Likewise, the 360-degree video server 102 can be implemented within a server in communication with one or more of the cellular core network 770 and or a mobile base station, e.g., an eNB 772. For instance, functions 768 of the eNB 772 can be similar to the functions described for the 360-degree video server 102 of FIG. 1 in accordance with method 600 of FIG. 6.

Multiple forms of media services can be offered to media devices over landline technologies such as those described above. Additionally, media services can be offered to media devices by way of a cellular network 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
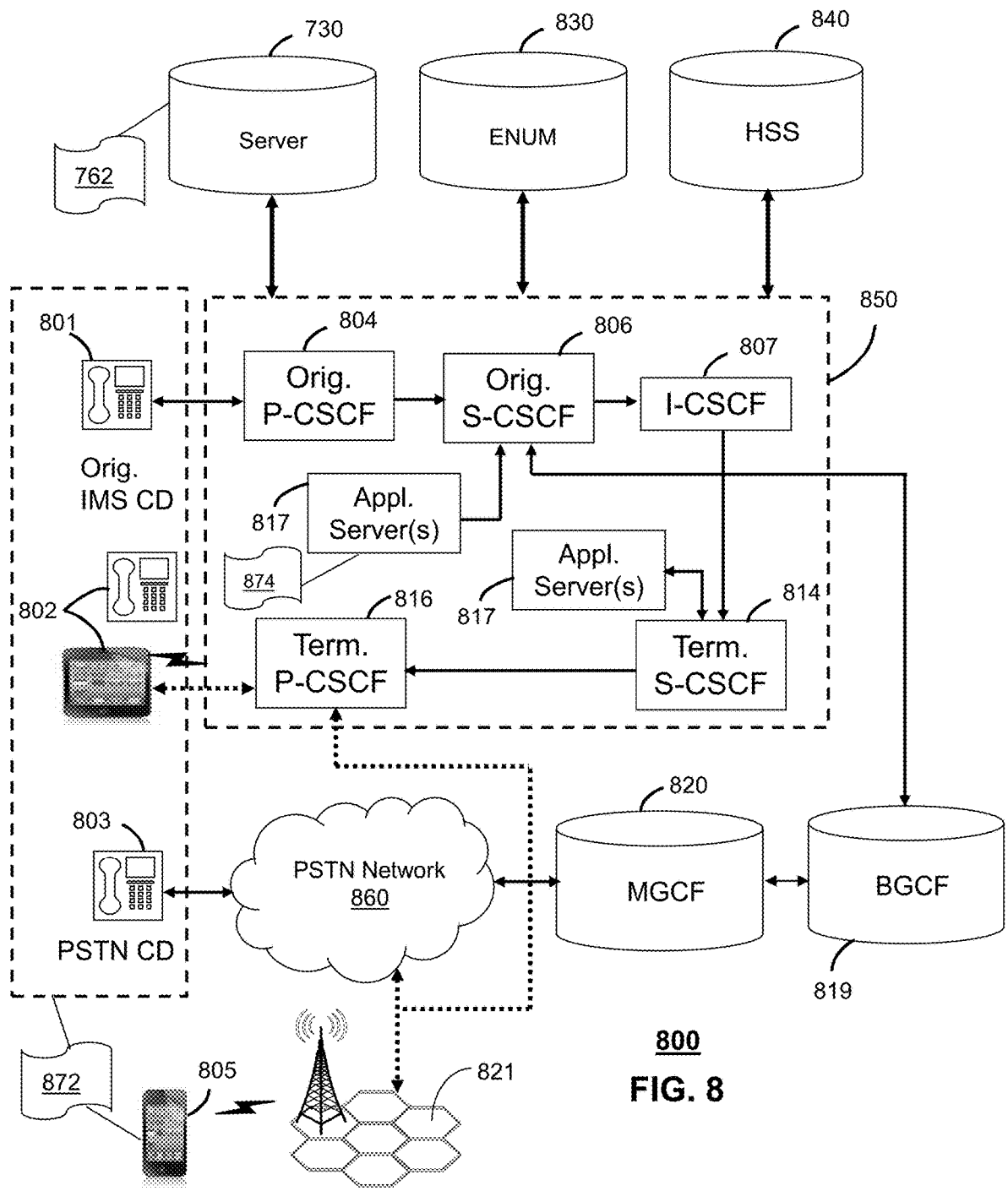

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 100 or device 200 of FIGS. 1 and/or 2 and communication system 700 as another representative embodiment of communication system 700. Elements of the communication system 700, alone or in combination with the 360-degree video server 102 of FIG. 1 or device 200 of FIG. 2, can perform a method that includes predicting a future orientation of a display region to be presented at a display of a video viewer; identifying a list of tiles for rendering the display region at the future orientation, wherein the display region corresponds to a plurality of tiles, wherein the list of tiles includes the plurality of tiles and zero or more tiles in a margin area outside of the display region; calculating a quality of experience from a plurality of first encoding bitrates for the plurality of tiles and a plurality of second encoding bitrates for tiles in the margin area; selecting a first encoding bitrate and a second encoding bitrate based on the quality of experience calculated; and providing the first encoding bitrate and the second encoding bitrate selected to the video viewer for downloading the plurality of tiles and the tiles in the margin area.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a Wi-Fi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The requestor 730 of FIG. 7 can be operably coupled to communication system 800 for purposes similar to those described above. Requestor 730 can perform function 762 and thereby provide encoding bitrate selection services to the CDs 801, 802, 803 and 805 of FIG. 8 similar to the functions described for requestor 730 of FIG. 7 in accordance with method 600 of FIG. 6. CDs 801, 802, 803 and 805, which can be adapted with software to perform function 872 to utilize the services of the requestor 730 similar to the functions described for requestor 120 of FIG. 1 in accordance with method 600 of FIG. 6. Requestor 730 can be an integral part of the application server(s) 817 performing function 872, which can be substantially similar to function 762 and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
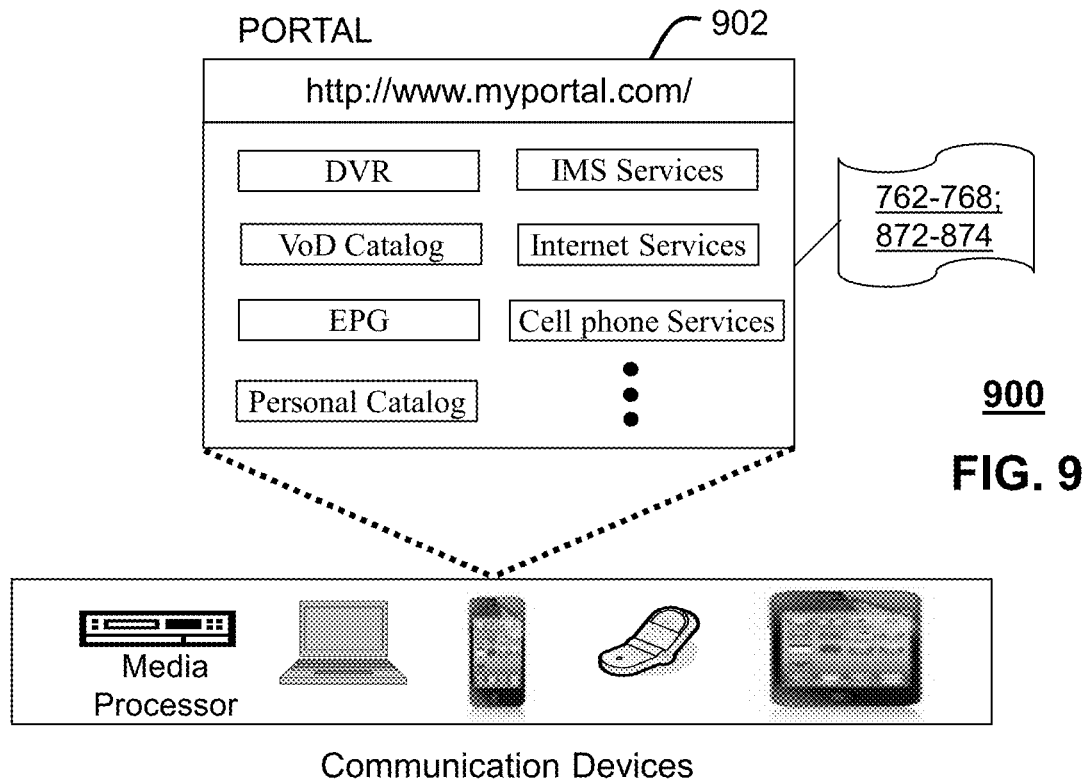
FIG. 9 depicts an illustrative embodiment of a web portal for interacting with the communication systems of FIGS. 7-8.

FIG. 9 depicts an illustrative embodiment of a web portal 902 of a communication system 900. Communication system 900 can be overlaid or operably coupled with 360-degree video server 102 and/or the 360-degree video client 106 in the system 100 of FIG. 1, and/or the device 200 of FIG. 2, the communication system 700, and/or the communication system 800 as another representative embodiment of the 360-degree video server 102, the 360-degree video client 106 in the system 100 of FIG. 1, the device 200 of FIG. 2, the communication system 700, and/or the communication system 800. The web portal 902 can be used for managing services of system 100 or device 200 of FIGS. 1 and/or 2 and communication systems 700-800, such as requestor 730. A web page of the web portal 902 can be accessed by a Uniform Resource Locator (URL) with an Internet browser using an Internet-capable communication device such as those described in FIGS. 1-2 and FIGS. 7-8. The web portal 902 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 902 can also be used for provisioning IMS services described earlier, provisioning Internet services, provisioning cellular phone services, and so on.

The web portal 902 can further be utilized to manage and provision software applications 762-768 and 872-874 to adapt these applications as may be desired by subscribers and/or service providers of system 100 of FIG. 1 and communication systems 700-800. For instance, users of the services provided by video server 102 or requestor 730 can log into their on-line accounts and provision the video server 102 or requestor 730 with user profiles or provide contact information to enable communication with video server 102 described in FIG. 1, and so on. Service providers can log onto an administrator account to provision, monitor and/or maintain the video server 102 or video client 106 of FIG. 1 or requestor 730 of FIG. 7.

Figure 10:
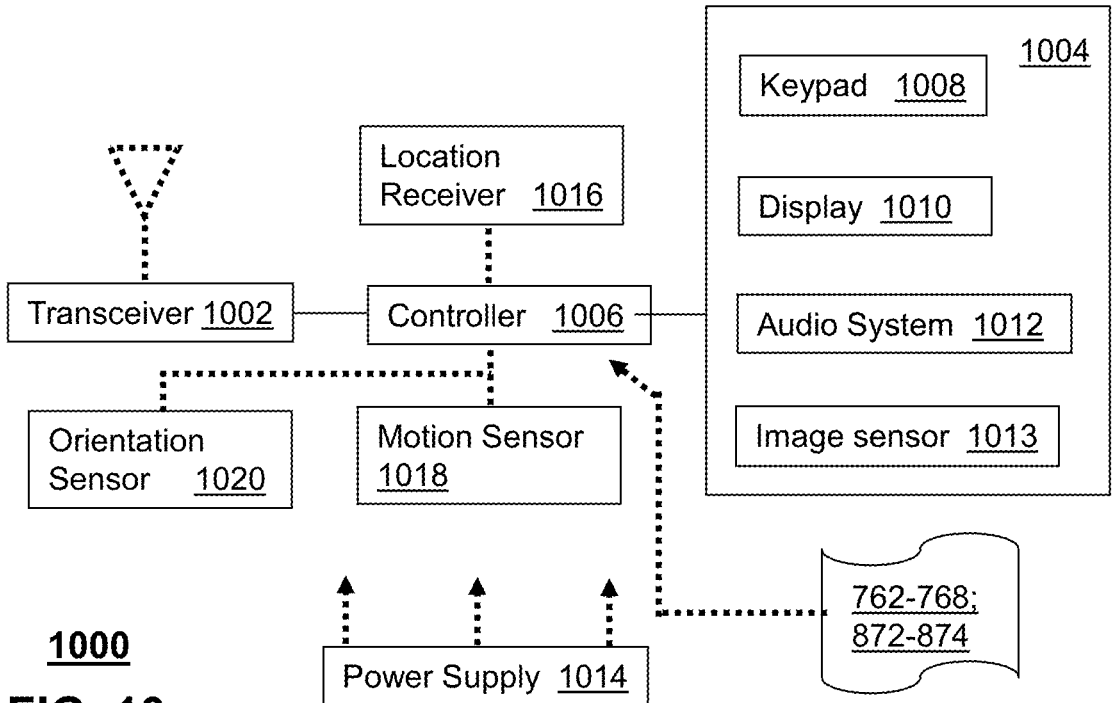
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1-2 and FIGS. 7-8 and can be configured to perform portions of method 600 of FIG. 6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of device 200, the media processor 706, the media devices 708, or the wireless communication devices 716 of FIG. 7, as well as the IMS CDs 801-802 and PSTN CDs 803-805 of FIG. 8. It will be appreciated that the communication device 1000 can also represent other devices that can operate in system 100 or device 200 of FIGS. 1 and/or 2, communication systems 700-800 of FIGS. 7-8 such as a gaming console and a media player. In addition, the controller 706 can be adapted in various embodiments to perform the functions 762-768 and 872-874, respectively.

Upon reviewing the aforementioned embodiments, it would be evident to an artisan with ordinary skill in the art that said embodiments can be modified, reduced, or enhanced without departing from the scope of the claims described below. For example, similar to regular DASH, the schemes disclosed herein, in at least some instances, can use HTTP(S) as an underlying delivery protocol. Each tile can be fetched by an HTTP request. A new observation here is that priorities of HTTP transactions play an important role in mitigating the user experience degradation caused by inaccurate prediction. Consider the following example. The player is in the progress of downloading tile "x" whose playback time is $t_2$. Then suddenly, the player realizes a predicted tile to be played at $t_1<t_2$ is incorrect. To fix this issue, the player immediately issues a request for tile "y" whose playback time is $t_1$. Since the delivery of tile y is more urgent than tile x, ideally the server should pause the transmission of tile x, and transmit tile y expediently, e.g., at its full speed. This can be realized by giving tile y a higher priority than tile x. New web protocols such as HTTP/2 already support fine-grained control of HTTP transactions' priorities that are very useful.

In yet another embodiment, the proposed rate adaptation scheme in the present invention can potentially be applied to the recently released VR180 video format by Google, which focuses on what is in front of viewers. Although 360-degree videos could be really powerful and bring an immersive experience to users, the creation of a 360-degree video is usually more challenging than regular videos. That is one of the reasons that there are not a large number of 360-degree videos online. Given that VR180 videos are simpler than 360-degree videos, by capturing only half of the surrounding space, the proposed rate adaptation scheme can be more easily implemented. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
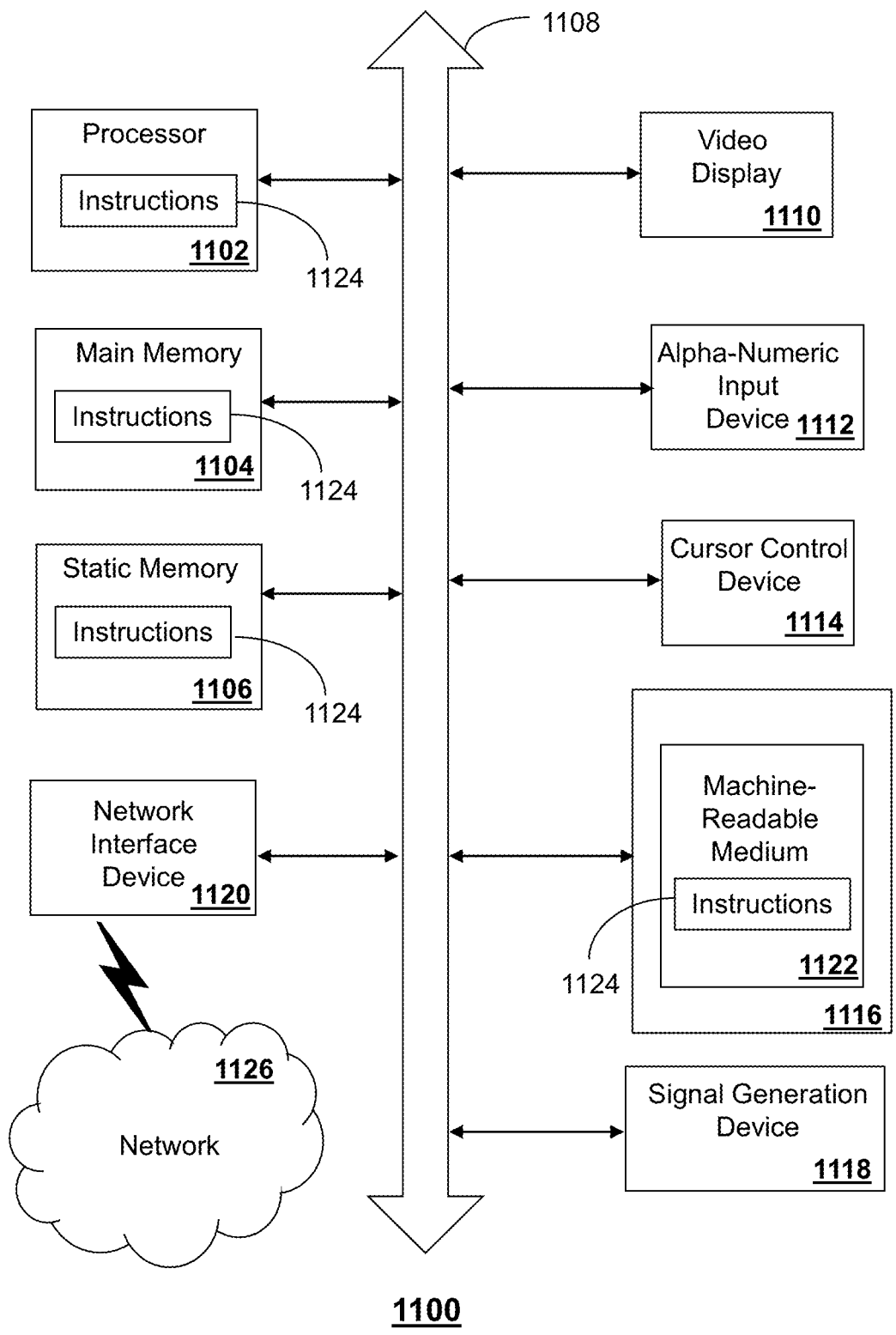
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the requestor 730, the media processor 706, the 360-degree video server 102, the 360-degree video client 106, and other devices of FIGS. 1-2. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, ZigBee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
determining an estimated available bandwidth for downloading panoramic video media data to a panoramic video viewer;
retrieving, from the memory, a plurality of video tiles defining portions of a panoramic video frame, the plurality of video tiles defining subareas of pre-segmented temporal chunks of the panoramic video frame, the plurality of video tiles having a same duration as the temporal chunks;
predicting a future orientation of a second display region of the panoramic video frame to be presented at a display of the panoramic video viewer at a second time based on an orientation of a first display region of the panoramic video frame at a first time, wherein the first display region corresponds to a first plurality of tiles of the plurality of video tiles;
identifying based on the future orientation of the second display region, a predicted list of tiles of the plurality of video tiles for rendering the second display region at the second time, wherein the second display region corresponds to a second plurality of tiles of the plurality of video tiles, wherein the predicted list of tiles includes the second plurality of tiles and zero or more tiles of the plurality of video tiles in a margin area outside of the second display region;
calculating a quality of experience from a plurality of first encoding bitrates for the second plurality of tiles and a plurality of second encoding bitrates for tiles in the margin area, resulting in a selected first encoding bitrate and a selected second encoding bitrate, wherein downloading the second plurality of tiles at the selected first encoding bitrate and the tiles in the margin area at the selected second encoding bitrate is within the estimated available bandwidth; and
facilitating download of the second plurality of tiles at the selected first encoding bitrate and the tiles in the margin area at the selected second encoding bitrate to the panoramic video viewer.

2. The device of claim 1, wherein the calculating the quality of experience includes each first encoding bitrate of the plurality of first encoding bitrates greater than each second encoding bitrate of the plurality of second encoding bitrates, and wherein the selected first encoding bitrate and the selected second encoding bitrate maximizes the calculating of the quality of experience.

3. The device of claim 2, wherein the operations further comprise determining an accuracy of the future orientation predicted and wherein the calculating the quality of experience is based on a sum of one of each first encoding bitrate of the plurality of first encoding bitrates plus a product of the accuracy and one of each second encoding bitrate of the plurality of second encoding bitrates.

4. The device of claim 3, wherein the quality of experience further comprises a product of a coefficient and a difference between each first encoding bitrate and an encoding bitrate for the first plurality of tiles.

5. The device of claim 1, wherein the estimated available bandwidth is estimated from a harmonic mean of tile throughput, and wherein the processing system comprises a plurality of processors operating in a distributed processing environment.

6. The device of claim 1, wherein the facilitating download of the second plurality of tiles and the tiles in the margin area is requested in a single bundle.

7. The device of claim 1, wherein the plurality of first encoding bitrates and the plurality of second encoding bitrates are embedded in a metafile exchanged at a beginning of a video session.

8. A non-transitory, machine-readable medium, comprising executable instructions that, when executed by a processing system including a processor, facilitate performance of operations, the operations comprising:
retrieving from memory a plurality of video tiles defining portions of a panoramic video frame, the plurality of video tiles defining subareas of pre-segmented temporal chunks of the panoramic video frame, the plurality of video tiles having a same duration as the temporal chunks;
predicting a future orientation of a second display region of the panoramic video frame to be presented at a display of a video viewer at a second time based on a first display region of the panoramic video frame at a present time, wherein the first display region corresponds to a first plurality of tiles of the plurality of video tiles;
identifying based on the future orientation of the second display region, a list of tiles for rendering the second display region at the second time, wherein the second display region corresponds to a second plurality of tiles of the plurality of video tiles, wherein the list of tiles includes the second plurality of tiles and zero or more tiles in a margin area outside of the second display region;
calculating a quality of experience from a plurality of first encoding bitrates for the second plurality of tiles of the plurality of video tiles and a plurality of second encoding bitrates for tiles in the margin area, wherein downloading the second plurality of tiles at each first encoding bitrate and the tiles in the margin area at each second encoding bitrate is within an estimated available bandwidth;
selecting a first encoding bitrate and a second encoding bitrate based on the quality of experience calculated; and
providing the first encoding bitrate and the second encoding bitrate selected to the video viewer for downloading the second plurality of tiles and the tiles in the margin area.

9. The non-transitory, machine-readable medium of claim 8, wherein the calculating the quality of experience is performed for each first encoding bitrate of the plurality of first encoding bitrates that is greater than each second encoding bitrate of the plurality of second encoding bitrates.

10. The non-transitory, machine-readable medium of claim 9, wherein the operations further comprise determining an accuracy of the future orientation predicted.

11. The non-transitory, machine-readable medium of claim 10, wherein the calculating the quality of experience comprises a sum of one of each first encoding bitrate of the plurality of first encoding bitrates plus a product of the accuracy and one of each second encoding bitrate of the plurality of second encoding bitrates.

12. The non-transitory, machine-readable medium of claim 11, wherein the selecting the first encoding bitrate and the second encoding bitrate maximizes the calculation of the quality of experience.

13. The non-transitory, machine-readable medium of claim 12, wherein the calculating of the quality of experience further comprises reducing the quality of experience when the first encoding bitrate changes from an encoding bitrate for the first plurality of tiles.

14. The non-transitory, machine-readable medium of claim 13, wherein the quality of experience is reduced by a product of a coefficient and a difference between each first encoding bitrate and an encoding bitrate for the first plurality of tiles.

15. The non-transitory, machine-readable medium of claim 14, wherein the operations further comprise determining an estimated available bandwidth from a harmonic mean of tile throughput, and wherein the processing system comprises a plurality of processors operating in a distributed processing environment.

16. The non-transitory, machine-readable medium of claim 15, wherein the plurality of first encoding bitrates and the plurality of second encoding bitrates are embedded in a metafile exchanged at a beginning of a video session.

17. A method, comprising:
 predicting, by a processing system including a processor, a future orientation of a display region of a panoramic video frame to be presented at a display of a panoramic video viewer;
 retrieving, by the processing system, from a memory, a plurality of video tiles defining portions of the panoramic video frame, the plurality of video tiles defining subareas of pre-segmented temporal chunks of the panoramic video frame, the plurality of video tiles having a same duration as the temporal chunks;
 identifying, by the processing system, a list of tiles of the plurality of video tiles for rendering the display region at the future orientation, wherein the display region corresponds to a plurality of tiles of the plurality of video tiles, wherein the list of tiles includes the plurality of tiles and zero or more tiles of the plurality of video tiles in a margin area outside of the display region;
 calculating, by the processing system, a quality of experience from a plurality of first encoding bitrates for the plurality of tiles and a plurality of second encoding bitrates for tiles in the margin area;
 selecting, by the processing system, a first encoding bitrate and a second encoding bitrate based on the quality of experience calculated; and
 providing, by the processing system, the first encoding bitrate and the second encoding bitrate selected to the panoramic video viewer for downloading the plurality of tiles and the tiles in the margin area.

18. The method of claim 17, wherein the plurality of tiles at the first encoding bitrate selected and the tiles in the margin area at the second encoding bitrate selected can be downloaded within a display time remaining for tiles in a buffer of the panoramic video viewer.

19. The method of claim 17, wherein the first encoding bitrate and the second encoding bitrate selected maximizes the quality of experience calculated.

20. The method of claim 17, wherein the plurality of first encoding bitrates and the plurality of second encoding bitrates are embedded in a metafile exchanged at a beginning of a video session.

* * * * *